(No Model.) 2 Sheets—Sheet 2.

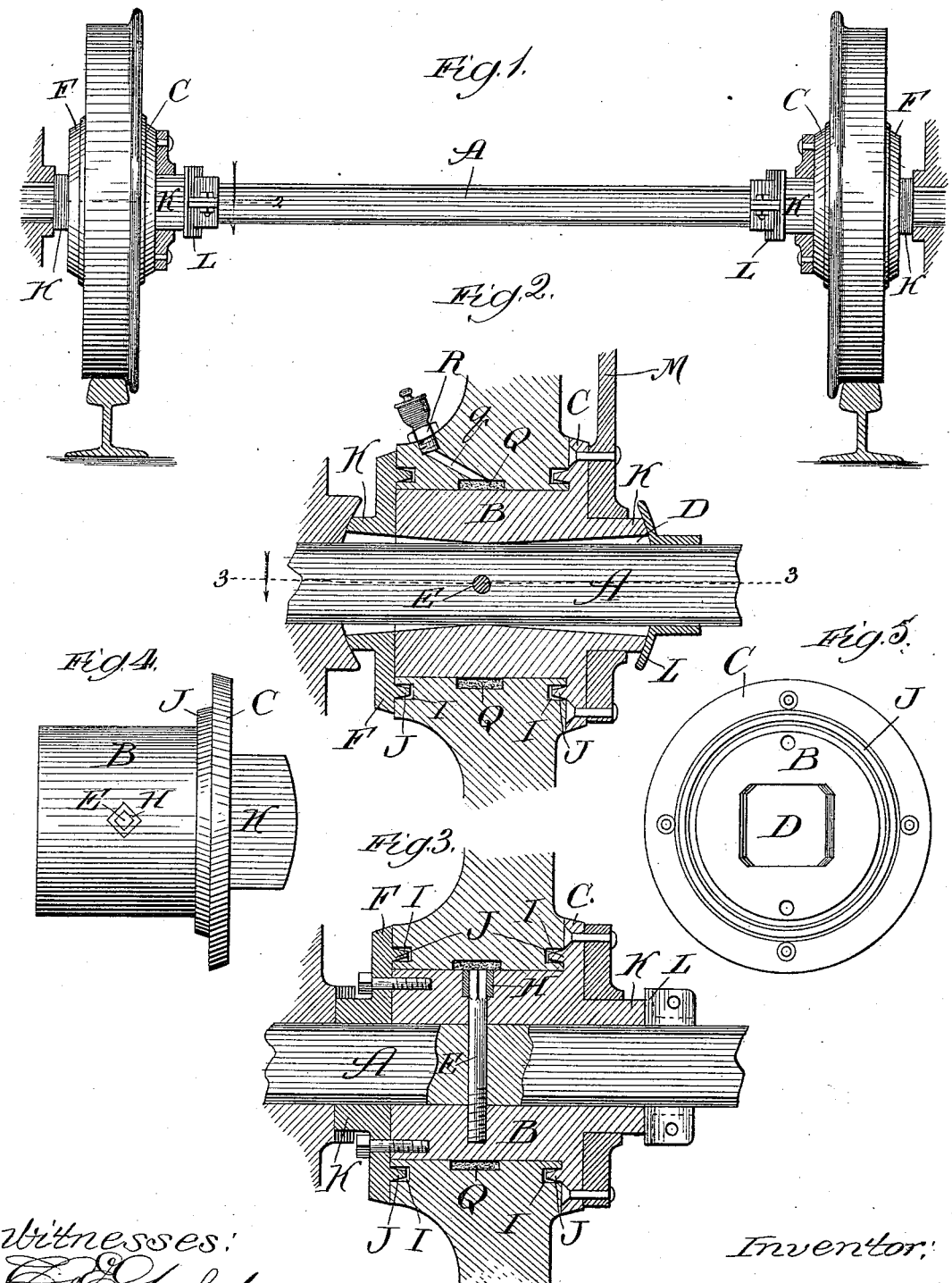

J. A. LA CROIX.
CAR WHEEL AND BRAKE.

No. 470,202. Patented Mar. 8, 1892.

Witnesses:

Inventor:
John A. La Croix,
By Banning & Banning & Payson,
Att'ys

UNITED STATES PATENT OFFICE.

JOHN A. LA CROIX, OF CHICAGO, ILLINOIS.

CAR WHEEL AND BRAKE.

SPECIFICATION forming part of Letters Patent No. 470,202, dated March 8, 1892.

Application filed January 23, 1891. Serial No. 378,780. (No model.)

*To all whom it may concern:*

Be it known that I, JOHN A. LA CROIX, a citizen of the United States, residing at Chicago, Illinois, have invented certain new and useful Improvements in Car Wheels and Brakes, of which the following is a specification.

The object of my invention is to further improve and perfect the car wheel and axle described and claimed in Letters Patent issued to me September 23, 1890, No. 436,897; and my invention consists in the features and details of construction hereinafter described and claimed.

Figure 6:
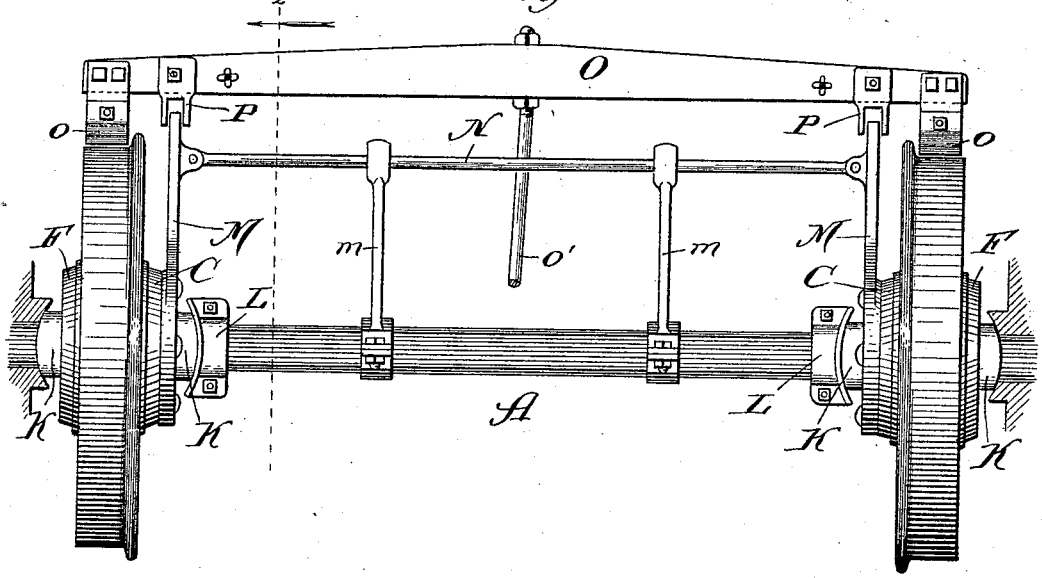
Figure 7:
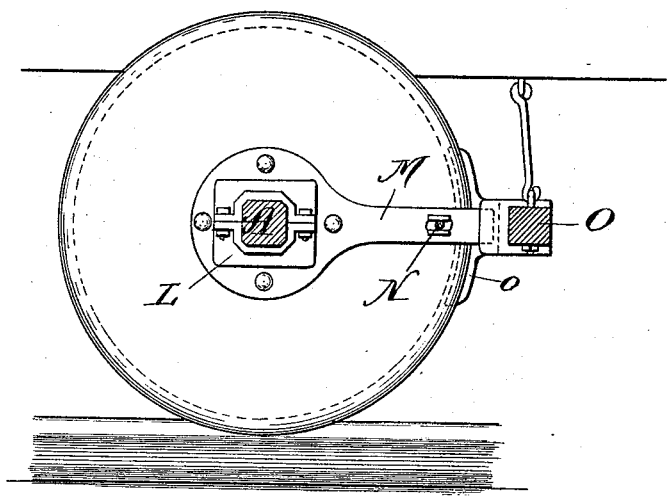
Figure 8:
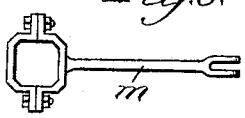

In the drawings, Figure 1 is an elevation of a pair of wheels connected together by the axle. Fig. 2 is a horizontal section taken through one of the wheels, showing the connection of the axle thereto. Fig. 3 is a vertical section of the box. Fig. 4 is a side elevation of the journal-box. Fig. 5 is an end elevation of the box. Fig. 6 is an end elevation of a pair of my improved wheels with a brake attachment adapted thereto. Fig. 7 is a side elevation of one of the wheels, taken through the line 2 of Fig. 6, looking in the direction of the arrow; and Fig. 8 is a detail of one of the parts hereinafter described.

In making my improved car wheel and axle I make an axle A, which is preferably rectangular in cross-section, which may be, but not necessarily, provided with cylindrical ends, where it rests in the journal-box. It is intended that the axle shall not rotate with the wheels, but remain constantly in the position in which it is placed when the parts are put together. I make journal-boxes B, provided with a hole through their center for the introduction of the ends of the axle. These journal-boxes are preferably cast, although they may be made in any convenient manner. When casting them, I provide them at one side with flanges C, which may be cast integral with the rest of the box. The hole D through the center of the journal is enlarged or beveled from the center toward each end in a horizontal direction, so that it is wider at its edges than the diameter of the axle. By this I mean that the hole through the journal-box is longer at the edges of the box than it is deep, giving it an oblong or slotted form horizontally at the edges of the box. The journal-box is provided with a vertical hole through its center, and the ends of the axle are also provided with a vertical hole, so that when the axle is in place in the journal-box the vertical hole of the box and the vertical hole of the axle will correspond and coincide, and a pin or bolt E is passed through the holes. I prefer to provide this pin or bolt with one square or angular end and with screw-threads at its other end, and to provide the hole through the journal-box with screw-threads at the lower side and with a square or angular countersunk space at the top. The pin is inserted in the hole and screwed into place, which will bring its rect-angular upper end into the square or angular countersunk space in the journal. When it has been screwed in sufficiently, a square or angular block H, fitting over the rectangular head of the bolt, is preferably inserted in the countersunk space in the journal. This will prevent the bolt from unscrewing or working in one direction or the other, so as to interfere with the rotation of the wheel on the journal, as hereinafter described. This arrangement will cause the journal-box and the axle to always remain in the same relative position with reference to each other. It will prevent the one from turning or rotating without the other and prevent the axle from being moved longitudinally in one direction or the other in the journal-box. It will, however, allow the journal-box to play or move on the axle, so that the inner side of the journal-box may be moved back as the outer side is moved forward, and vice versa. This will enable the axle to assume different angular positions with reference to the journal-box, so as to extend out therefrom at right angles, or at an angle forward or back of a right angle.

The operation will be readily understood by an inspection of Fig. 2, which, as above stated, is a plan view of a horizontal section of a wheel, showing the position and relation of the parts. The wheel is made with a hole through its center of a proper size to receive the journal-box, which, as shown in Figs. 4 and 5, is cylindrical in external form. The journal-box is also provided with holes passing into the same and screw-threaded to receive bolts. These holes may be of any desired number and may be located or arranged in any desired position. The journal-box is inserted in the hole in the wheel until the flange C abuts against the side of the wheel. Another flange F is then slipped over the end of the axle and brought against the opposite side of the wheel from the flange C. It is also provided with holes corresponding to the holes made in the journal-box above described, and screw-threaded bolts G are inserted in the holes, so as to bind the journal-box and the flange securely together. This operates to attach or connect the journal-box with the wheel. As before said, the exterior of the journal-box is made cylindrical in form, and a cylindrical hole is made in the wheel corresponding in size, so that the one may properly fit the other. As the journal-box is prevented from rotating with the axle, the wheel must rotate on it, and to enable this to be done the journal-box and the wheel-hole are made cylindrical.

To prevent dirt and dust from working in between the flanges and the wheel, I make an angular groove or channel I in the wheel and provide the flanges C and F with a corresponding inwardly-extending annular rim J, that fits into the annular groove when the parts are connected together. The flanges C and F are also provided with an outwardly-extending rim K, and the axle is provided with a guard L, that fits against the same to prevent the entrance of dust or dirt at this point. As the journal moves on the axle as the wheels pass a curve in the track, the rims K move along the inner face of the guards L, but always so as to maintain their proper relative position thereto.

As the journal and axle are permitted to change their relative positions as the wheels pass around a curve, it is necessary to provide brakes specially adapted to change their positions correspondingly, so as to be able to bear against the surface of the wheels at all times. To make such brake I arrange on the inner flange of the journals plates M, extending forward a sufficient distance to bring their forward ends to a point about even with the forward edge of the wheels. These plates are connected together by a bar N, which is pivotally connected to them at its ends. To afford additional support I arrange on the axle one or more forwardly-extending supports m, which assist in sustaining the weight of the bar N. A brake-beam O is equipped or provided with brakes o, bearing against the faces of the wheels in the usual way. A brake-rod o' enables it to be drawn against or moved from the face of the wheels. Near its ends it is provided with slotted plates P, that extend back to embrace the forward ends of the plates M, which, as above said, are attached to the inner flanges of the journals. As the wheels change their positions on the axle, the plates M of course correspondingly change position. In doing this the forwardly-extending plates M bear against one side or the other of the slotted plates P, so as to move the brake-beam and its brakes a corresponding distance. In this way whatever position the wheels may assume on the axle there will be a corresponding change of position effected in the brake-beam and its brakes, so that when it is clamped against the faces of the wheels it will always approach them in the right position and properly bear against them.

In order to provide a proper supply of oil between the wheel and the journal-boxes, I provide the wheel with a channel or groove Q, which extends around the journal-box. One or more holes q lead from the channel or groove to the outside of the wheel, preferably as shown in Fig. 2. After the groove or channel and hole have been filled with oil a top screw R is screwed into the end of the hole to prevent the oil or lubricant from escaping or being lost as the wheel revolves.

What I regard as new, and desire to secure by Letters Patent, is—

1. The combination of a car-wheel provided with an annular groove in its side, a non-rotatable journal for the wheel, adapted to permit the axle in it to shift and change the angle between itself and the wheel, and provided with an annular rim adapted to fit the annular groove in the side of the wheel, substantially as described.

2. The combination of a car-wheel provided with an annular groove in its side, a non-rotatable journal for the wheel, adapted to permit the axle in it to shift and change the angle between itself and the wheel, and provided with an annular rim adapted to fit the annular groove in the side of the wheel and with an outwardly-extending rim, and a non-rotatable axle provided with a guard that fits against the outwardly-extending rim of the journal, substantially as described.

3. The combination of a car-wheel, a non-rotatable journal for the wheel, adapted to shift and change the angle between itself and wheel and the axle, a forwardly-extending plate supported on the journal and adapted to change and shift with the journal and wheel, a brake-beam engaged by the forwardly-extending plate and shifted with it, and brake-shoes mounted on the brake-beam and shifted with it to constantly remain in position to engage the face of the wheel, substantially as described.

JOHN A. LA CROIX.

Witnesses:
THOMAS A. BANNING,
ANNIE C. COURTENAY.